United States Patent
Yarbrough et al.

(10) Patent No.: US 6,465,561 B1
(45) Date of Patent: Oct. 15, 2002

(54) CORROSION-RESISTANT COMPOSITION OF MATTER HAVING ENHANCED THERMAL CONDUCTIVITY, HEAT EXCHANGERS MADE THEREFROM, AND METHOD OF MAKING SAME

(76) Inventors: Merrill A. Yarbrough, 730 S. Military Trail, Deerfield, FL (US) 33442; Alma Coats, 730 S. Military Trail, Deerfield Beach, FL (US) 33442

( * ) Notice: Subject to any disclaimer, the term of this patent is extended or adjusted under 35 U.S.C. 154(b) by 0 days.

(21) Appl. No.: 09/312,250

(22) Filed: May 14, 1999

(51) Int. Cl.⁷ .................................................. C08K 3/04
(52) U.S. Cl. ...................... 524/496; 524/495; 524/440
(58) Field of Search ................. 524/440, 495, 524/496

(56) References Cited

U.S. PATENT DOCUMENTS

| 3,132,989 A | 5/1964 | Stenerson |
| 3,489,209 A | 1/1970 | Johnson |
| 3,498,371 A | 3/1970 | Zygiel |
| 3,968,786 A | 7/1976 | Spielberg |
| 4,030,541 A | 6/1977 | Gross et al. |
| RE31,732 E | 11/1984 | Reilly et al. |
| 4,955,435 A | 9/1990 | Shuster et al. |
| 5,660,758 A | 8/1997 | McCullough |
| 5,667,870 A | 9/1997 | McCullough |
| 5,774,335 A | 6/1998 | Pare et al. |
| 5,784,257 A | 7/1998 | Tata |
| 5,825,622 A | 10/1998 | Rife et al. |
| 5,837,340 A * | 11/1998 | Law et al. .................. 428/36.8 |
| 5,844,036 A * | 12/1998 | Hughes ....................... 524/494 |

FOREIGN PATENT DOCUMENTS

| DE | 26 37 511 | 8/1976 |
| GB | 558124 | 12/1943 |
| GB | 1 503 250 | 3/1978 |
| JP | 60-200097 | 7/1928 |

* cited by examiner

*Primary Examiner*—Edward J. Cain
(74) *Attorney, Agent, or Firm*—Kevin P. Crosby, Esq.; Brinkley, Mcnerney, Morgan, Solomon & Tatum, LLP

(57) ABSTRACT

The invention includes compositions containing resins (particularly linear crystal polymers) and carbon (particularly impervious graphite) that are made through injection molding and like processes. The compositions produced have enhanced anisotropic thermal conductivity, can have complex shapes as produced by molding that includes lost cores, and are corrosive resistant. The enhanced thermal conductivity can be utilized in applications such as heat exchangers.

6 Claims, 7 Drawing Sheets

CORROSION-RESISTANT COMPOSITION OF MATTER HAVING ENHANCED THERMAL CONDUCTIVITY, HEAT EXCHANGERS MADE THEREFROM, AND METHOD OF MAKING SAME

BACKGROUND OF THE INVENTION

1. Field of the Invention

The invention relates to compositions which utilize a combination of resins and thermally-conductive particles to produce a composition which resists corrosion and has an enhanced thermal conductivity. The composites can be anisotropic; that is, they exhibit enhanced thermal conductivity in specific directions through the material. The invention also includes methods of making the compositions, and methods of utilizing the compositions.

The invention finds ready application in the field of heat exchangers and heat transfer.

2. Description of Related Art

Heat exchangers promote the transfer of thermal energy (heat) from one medium to another. Depending on the application and the relative temperatures of the media, heat can be transferred in either direction across the heat exchanger.

In the abstract, a common configuration for heat exchangers involves a thermal conductor separating two mediums. Heat from the warmer medium is transferred across the conductor to the cooler medium. In this way, heat is exchanged.

In practice, heat exchangers most often comprise complicated arrangements of metallic tubes soldered together into a continuous path. The manufacture of such complicated piping arrangements is difficult and leaks at faulty solder connections are common. Furthermore, the solder connections loosen from the continuous vibrational environment in which many heat exchangers are used. In some heat exchangers, the metallic tubes are surrounded by metal fins in an attempt to make the most efficient use of available heat conducting surfaces. These metallic fins are themselves difficult to manufacture and are relatively inefficient. In other heat exchanger applications, the metallic tubes are wrapped into a coil and placed in contact with the outer surface of a container. In such arrangements, the area of contact between the tubing and the container is relatively small, resulting in an inefficient heat exchanger.

The materials used in existing heat exchangers are generally homogeneous. In other words, the materials are made of one substance having common characteristics throughout. Because the materials are homogeneous, the materials tend to conduct heat equally in all directions ("isotropically").

Metal is the most common material from which heat exchangers are built. Generally, metals are good thermal conductors; that is, they have high indexes of thermal conductivity. The best conductors are the "noble metals" which include gold, silver, and platinum. However, noble metals are very expensive. For most applications, with the notable exception of the aerospace industry, the noble metals are too expensive for practical use as a material in heat exchangers. Even the non-noble metals are relatively expensive materials compared to resins.

Metals have other qualities beyond price that limit their use in heat exchangers. In a typical metal heat exchanger, pieces of metal are connected to each other by brazing. These heat exchangers contain a large number of joints, each of which must be brazed. Brazing is expensive, and the joints formed by brazing often leak.

Metal heat exchangers are difficult to shape. While the metals themselves are malleable, the joints used in the heat exchanger are not malleable, and often break when bent. Metals require extreme temperatures to melt. This makes metals difficult and costly to mold.

Metal heat exchangers are susceptible to corrosion. If the heat exchanger is located in a corrosive environment, most will corrode and eventually fail. A specific example of a corrosive application is a swimming-pool heater or heat pump that is exposed to chlorine. Other corrosive environments are sea water and smoke stacks.

Resins are an alternative material from which heat exchangers can be formed. Resins have the benefit of being easily molded into practically any shape. Chemical resistant resins are well known and can be chosen when required by the application. Resins without more are often brittle and, therefore, may shatter. A heat exchanger made of pure resin may break when exposed to mechanical forces. Also, resins are less thermally conductive than metals. In materials having a low thermal conductivity, the rate at which heat is transferred across a surface (i.e. from one medium to another) is low. For this reason, heat exchangers made of traditional resins have to be larger than heat exchangers of equal capacity made of metal.

Carbon as a sole ingredient is not a useful material from which to build heat exchangers despite its many positive attributes. Carbon does have a higher thermal conductivity than most resins. However, carbon has a lower thermal conductivity than most metals. Carbon is relatively inexpensive, and is commercially available in several grades. Graphite is one grade of structured carbon. Graphite has a higher thermal conductivity but costs more than ordinary carbon. Carbon and graphite comprise particles of various shapes and sizes. These shapes include powder, flakes, and fibers. Carbon is corrosion resistant, but as a sole ingredient cannot be used to make a heat exchanger because carbon is difficult to shape in large homogenous blocks such as those needed to form a heat exchanger. Also, carbon without more is too brittle and susceptible to chipping to be the only ingredient in a heat exchanger.

The prior art discloses adding metal powders to resins to increase thermal conductivity of a composition. Furthermore, the prior art shows specific applications of these materials to heat exchangers. Abbey, UK Patent 558, 124, issued Oct. 11, 1944, describes "Improvements Relating to Heat Exchangers and Like Apparatus Having Heat Radiating Fins or Plates." Zygiel, U.S. Pat. No. 3,498,371, issued Mar. 3, 1970, describes a "Heat Transfer Device." The resin-metal compositions disclosed therein are costly because the cost of the metal ingredient is relatively high compared to other materials. The metal in the resin is also susceptible to corrosion. Moreover, the disclosed compositions without more are not able to conduct heat at a higher rate in selected directions through the material (i.e. they are limited to isotropic conduction of heat).

Other patents disclose the addition of graphite powder to resin to make heat exchangers. Dainippon Ink Kagaku Kogyo K. K., JP Patent 60-200097, issued Oct. 9, 1985, describes a "Heat Exchanger of Hollow Fiber Type." Dainippon discloses a heat exchanger utilizing hollow tubes filled with graphite that conduct heat. Dainippon does not disclose a composition that can be molded or shaped.

Hahn, DE Patent 26 37 511, issued Feb. 23, 1978, describes an "Improved Conductivity Plastic Heat Exchanger Material—Having Particles of Metal or other High Conductivity Material Embedded in It." Hahn discloses in general terms the use of higher thermal-conductivity materials such as metal in a resin. Hahn does not specifically consider carbon or the advantages of carbon over mere highly-conductive particles. Hahn discloses that the particles can be powders, granules, or splinters. Hahn arranges the material into grids, lattices, and veneers that can be located along the exterior to reinforce the resin. Hahn does not disclose a method to integrate the particles into the resin. Hahn does not consider methods involving molds to make compositions having particles arranged to increase thermal conductivity in parts of the resin or in certain preferred directions in the composition.

Plate-type heat exchangers are described in the prior art. Schon, U.S. Pat. No. 4,744,414, issued May 17, 1988, describes a "Plastic Film Plate-Type Heat Exchanger." These heat exchangers comprise a stack of alternating plates sandwiched to each other. Two media (usually liquids) are separated by passing one medium through a first of the alternating plates while passing the other medium through the other set of alternating plates. Heat is transferred from medium to medium through the intervening walls of the plates. Plastic is used to construct the plates. However, as Schon discusses, plastic without more is a poor thermal conductor. The poor conductance of plastic is why Schon requires the use of polymer film to separate the media. Schon does not disclose the inclusion of materials to enhance the thermal conductivity of the resin. Nor does Schon disclose aligning the direction of enhanced thermal conductivity to increase the overall heat transferred by the heat exchanger.

Liquid crystal polymers ("LCPs") are well-known in the prior art. LCPs exhibit anisotropy in the liquid phase. They may be characterized as thermotropic (i.e., liquid crystal in the melt) or lyotropic (i.e., liquid crystal in solution). Liquid crystal polymers have very stiff, rod-like molecules. In the quiescent state, the molecules line up in an ordered array in local regions, thereby forming domains. The individual domains, however, are not lined up into any particular ordered array; instead they exhibit random orientations. Ide discloses a "Process for Extruding Liquid Crystal Polymer" in U.S. Pat. No. 4,332,759, issued on Jun. 1, 1982. Ide discloses a method of shaping LCP through extrusion to make articles having enhanced physical properties due to the orientation of the crystalline domains in the polymer molecules parallel to the flow direction. Ide's method also produced articles wherein the LCP molecules are oriented in such a manner so that they are self-reinforcing and have mechanical properties comparable to articles formed from fiber-reinforced isotropic polymeric materials. Ide does not consider extruding LCP containing particles. Nor does Ide contemplate or disclose the desirability of creating components with carbonaceous materials to create items having enhanced thermal conductivity. "Carbonaceous materials" can be defined as elements of carbon structured in forms such as graphite and diamonds.

The injection molding of materials comprising 45–60% graphite powder and 40–55% LCP resin for use as an electrically conductive material is disclosed in U.S. Pat. No. 5,882,570, issued on Mar. 16, 1999, to Hayward. This patent describes material optimized for electrical conductivity. For this reason, the material is limited to compositions having 45–60% graphite powder and 40–55% LCP resin. The patent does not describe formulations optimized for thermal conductivity.

Therefore, a need exists for a heat exchanger which is lightweight and inexpensive but which possesses corrosion resistance and heat transfer characteristics similar or superior to those already known.

SUMMARY OF THE INVENTION

One object of the invention is to provide a chemical composition comprising a resin with particles encapsulated therein: the particles generally having higher thermal conductivity than the resin. The composition created has a thermal conductivity greater than the thermal conductivity of the resin and the thermal conductivity of the particles alone.

"Thermal conductivity" is defined as the heat flow across a surface per unit area per unit time, divided by the negative of the rate of change of temperature with distance in a direction perpendicular to the surface; thermal conductivity is also known as heat conductivity. Alternatively, thermal conductivity can generally be thought of as the rate at which heat is conducted through a substance. That term, as used herein refers to either or both concepts.

The invention also encompasses articles that require heat to be directionally transferred throughout themselves.

Another object of the invention is to provide a method of making a composition resulting in anisotropic articles that conduct heat at different rates into, out of, and through the article depending on the design of the article.

A still further object of the invention is the provision of a heat exchanger made from the anisotropic composition wherein the composition is constructed and arranged to provide increased transfer of heat between two mediums.

In accordance with these and other objects which will become apparent hereinafter, the instant invention will now be described with particular reference to the accompanying drawings.

DETAILED DESCRIPTION OF THE PREFERRED EMBODIMENTS

Figure 1:
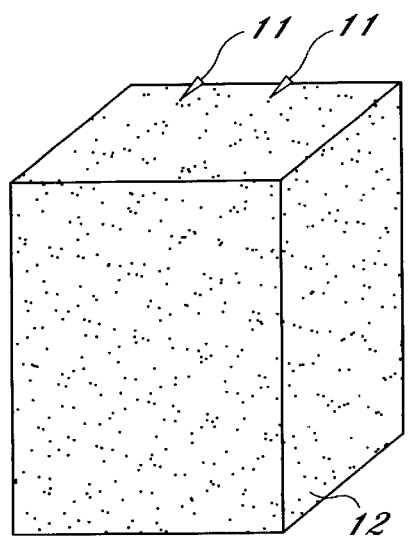
FIG. 1 shows an isotropic composition containing a powder.

The instant invention comprises compositions, a method of manufacturing said compositions, and articles formed from the compositions. The compositions comprise resin and highly thermally conductive particles, meaning particles having a thermal conductivity generally in excess of the thermal conductivity of the resin. Another term by which the particles may be referred to is "carbonaceous".

While many resins are suitable, liquid crystal polymers ("LCPs") are the preferred type of resin to be used in the composition. Representative classes of polymers from which the thermotropic liquid crystal polymers suitable for use in the present invention may be selected include wholly aromatic polyesters, aromatic-aliphatic polyesters, wholly aromatic poly (ester-amides), aromatic-aliphatic poly (ester-amides), aromatic polyazomethines, aromatic polyester-carbonates, and mixtures of the same. In preferred embodiments of the present invention, the thermotropic liquid crystal polymer employed is a wholly aromatic polyester, a wholly aromatic poly (ester-amide), or an aromatic-aliphatic poly (ester-amide), with the wholly aromatic polyesters being most preferred. In such wholly aromatic polyester and wholly aromatic poly (ester-amide) each moiety present within the polymer chain contributes at least one aromatic ring. Also, it is preferred that naphthalene moieties be included in the thermotropic liquid crystalline polymer, e.g. 6-oxy-2-naphthoyl moiety, 2,6-dioxynaphthalene moiety, or 2,6-dicarboxynaphthalene moiety, most preferably in a concentration of not less than about 10 mole percent. The particularly preferred naphthalene moiety for inclusion in the thermotropic liquid crystal polymer is the 6-oxy-2-naphthoyl moiety in a concentration of not less than about 10 mole percent.

Representative wholly aromatic polyesters which exhibit thermotropic liquid crystalline properties include those disclosed in the following U.S. Pat. Nos. which are herein incorporated by reference: U.S. Pat. Nos. 3,991,013; 3,991, 014; 4,066,620; 4,067,852; 4,075,262; 4,083,829; 4,093, 595; 4,118,382; 4,130,545; 4,146,702; 4,153,779; 4,156, 070; 4,159,365; 4,191,470; 4,169,933; 4,181,792; 4,183, 895; 4,184,996; 4,188,476; 4,201,856; 4,219,467; 4,224, 433; 4,226,973; 4,230,817; 4,232,143; 4,232,144; 4,238, 598; 4,238,599; 4,238,600; 4,242,496; 4,245,082; 4,245, 084; 4,247,514; 4,256,624; 429,580; 4,267,304; 4,269,965; 4,279,803; 4,299,756; 4,294,955; 4,337,190; 4,337,191; 4,318,841; and 4,355,134. The wholly aromatic polyesters are the preferred liquid crystal polymers to be used in the present invention. As discussed hereafter, the wholly aromatic polyesters of U.S. Pat. Nos. 4,256,624; 4,161,470 and 4,184,996 are among those particularly suitable for use in the present invention.

Representative aromatic-aliphatic polyesters which exhibit thermotropic liquid crystalline properties are copolymers of polyethylene terephthalate and hydroxybenzoic acid as disclosed in Polyester X-7G A Self Reinforced Thermoplastic, by W. J. Jackson, Jr. H. F. Kuhfuss, and T. F. Gray, Jr., 30th Anniversary Technical Conference, 1975 Reinforced Plastic/Composites Institute, The Society of the Plastics Industry, Inc. Section 17-D, Pages 1–4. A further disclosure of such copolymers can be found in "Liquid Crystal Polymers," Journal of Polymer Science, Polymer Chemistry Edition, Vol 14, pages 2043 to 2058 (1976), by W. J. Jackson, Jr. and H. F. Kuhfuss. See also U.S. Pat. Nos. 4,318,841 and 4,355,133, which are herein incorporated by reference.

Representative wholly aromatic and aromatic-aliphatic poly(ester-amides) which exhibit thermotropic liquid crystalline properties are disclosed in U.S. Pat. Nos. 4,272,625; 4,330,457; 4,351,917; 4,351,918; 4,341,688; 4,355,13; and 3,399,375, which are herein incorporated by reference. The poly (ester-amide) of U.S. Pat. No. 4,330,457 is particularly suitable for use in the present invention.

Representative aromatic polyazomethines which exhibit thermotropic liquid crystalline properties are disclosed in U.S. Pat. Nos. 3,493,522; 3,493,524; 3,503,739; 3,516,970; 3,516,971; 3,526,611; 4,048,148; and 4,122,070. Each of these patents is herein incorporated by reference. Specific examples of such polymers include poly (nitrilo-2-methyl-1,4-phenylenenitrilothylidyne-1,4,-phenyleneethyldyne); poly(nitrilo-2-methyl-1,4-phenylenenitrilo-methlidyne-1,4-phenylene-methylidyne); and poly(nitrilo-2-chloro-1,4-phenylenenitilomethylidyne-1,4-phenylenemethylidyne).

Representative aromatic polyester-carbonates which exhibit thermotropic liquid crystalline properties are disclosed in U.S. Pat. Nos. 4,107,143; 4,284,757; and 4,371, 660, which are herein incorporated by reference. Examples of such polymers include those consisting essentially of p-oxybenzoyl units, p-dioxyphenyl units, dioxycarbonyl units, and terephthoyl units.

One preferred type of LCP is sold under the tradename VECTRA®. A resin, a polymer comprising monomer units derived from 4-hydroxybenzoic acid (73 mole %) and 6-hydroxy-2-naphthoic acid (27 mole %) (available from Hoechst Celanese Corp.). Two particularly preferred grades of this polymer are VECTRA® A910 and VECTRA® A950. Other preferred LCP's available from Hoechst Celanese Corp. include VECTRA® B resin, a polymer comprising monomer units derived from 6-hydroxy-2-naphthoic acid (60 mole 6), terephthalic acid (20%), and p-acetaminophenol (20%), VECTRA® C resin, a polymer comprising monomer units derived from 4-hydroxybenzoic acid (80%) and 6-hydroxy-2-naphthoic acid (20%0, and VECTRA® E resin, a polymer comprising monomer units derived from 4-hydroxybenzoic acid (60 ole %), 6-hydroxy-2-naphthoic acid (5%), terephthalic acid (17.5%), and biphenol (17.5%).

It is also within the scope of the present invention to make LCP blends containing a non-LCP polymer (e.g., LCP+ thermally conductive particles+non-LCP). These blends could include any non-LCP compatible with LCP in the blend, including aliphatic or aromatic polyesters or polyacrylates, or the like.

The following table describes several preferred embodiments of the composition. The compositions were injection molded into plates and had their thermal conductivities measured.

| RESIN | WT (%) | PARTICLE | WT (%) | IN-PLANE THERMAL CONDUCTIVITY (BTU in/hr/ft²F) | THROUGH PLANE CONDUCTIVITY (BTU in/hrft²F) |
|---|---|---|---|---|---|
| LCP | 30 | Graphite Powder | 70 | 135.0 | 15.6 |
| LCP | 50 | Copper Powder | 50 | 2.4 | 2.0 |
| PPS | 80 | Copper Powder | 20 | 3.5 | 3.1 |
| LCP | 30 | Graphite Powder | 65 | 172.5 | 15.87 |
|  |  | Graphite Fiber | 5 |  |  |
| LCP | 35 | Graphite Powder | 65 | 172.5 | 15.87 |
| LCP | 40 | Graphite Powder | 60 | 15.87 | 172.5 |
| LCP | 30 | Graphite Powder | 70 | 101.43 | 14.77 |
| LCP | 30 | Graphite Powder | 50 | 174.0 | 15.1 |
|  |  | Graphite Fiber | 20 |  |  |

The preferred embodiment includes less than one percent by weight of an impact modifier. The amount of impact modifier depends on the degree of shock-resistance required. Flow inhibitors or enhancers can also be included to optimize viscosity during molding.

The combination of LCP and carbonaceous particles used in this invention produces a composition having a thermal conductivity greater than the thermal conductivity of its parts. This enhanced thermal conductivity is a synergistic effect not predicted by the prior art. By combining the resin with particles having a thermal conductivity which is greater than that of the resin in the manners which are within the scope of this invention, the thermal conductivity of the composition is greater than the thermal conductivity of a composition made of resin and carbonaceous particles only. In addition, a composition made of resin and particles of higher thermally conductive material is less expensive and less corrodible than a composition consisting of the higher thermally conductive material alone. The inclusion of a resin allows the composition to be set into complex shapes. Methods of making the composition include extrusion, injection molding, and lost-core injection molding. These methods of shaping are discussed in detail later. The resin binds the particles to each other, and the particles act to reinforce the resin. The particles are believed to thermally connect the crystalline domains in the LCP.

The higher thermally-conductive, i.e. carbonaceous, material included in the composition can be in any form. Preferably, the material is in the form of powder particles, fibers, or flakes, or any combination thereof. Powder particles are ground to a desired size and are characterized by a particle size which represents an average particle size for the lot. Preferably, the powder particle size is between one tenth of a micron and 50 microns (0.10 $\mu$–50 $\mu$). When mixed homogeneously with a resin, powders generally produce an equal (i.e. isotropic) thermal conductivity in all directions throughout the composition.

The particles included in the composition also, or alternatively, can be flakes. Flakes are irregularly shaped particles typically produced by rough grinding or shaving and can be characterized by a mesh size through which the flakes will pass. The preferred size of flakes for use in the instant invention is between one and 200 microns (1.0 $\mu$–200 $\mu$). Like powders, homogenous compositions containing flakes generally have thermal conductivities which are equal in all directions.

Fibers or rods ("fibers") are another or an additional form of carbonaceous particle that can be used. Fibers are long thin particles. Fibers are usually described by their lengths and diameters. The preferred length of the fibers ranges between 2 mm and 15 mm. The preferred diameter of the fibers ranges between 1 mm and 5 mm. The inclusion of fibers in the composition has the added benefit of reinforcing the resin, adding material strength, and providing preferred directionality to the direction of heat transfer when oriented in similar directions.

The invention includes any combination of particles and resin. The composition has a preferred weight percentage in the overall composition of less than forty percent by weight of resin and the balance of the weight comprises the particles and any performance additives such as, for example but not by way of limitation, flow is inhibitors and impact modifiers.

Mixtures of particles of different types of shapes can be included in one composition.

The resin can be chosen depending on the application for which the composition will be used. For example, the resin can be a thermoplastic or a thermoset depending on the flexibility and reshaping required.

Certain resins can be chosen based on their high thermal conductivities. Examples of resins having high thermal conductivities are poly ethylene sulfide and liquid crystal polymers. The crystalline domains in liquid crystal polymers are thought to promote thermal conduction. Other or additional polymers may be used depending upon the requirements of a particular application.

The composition can include a copolymer comprising several resins.

The particles are preferably made of any material having a greater thermal conductivity than the resin. Particles having greater thermal conductivity will increase the thermal conductivity of the compositions relative to compositions having an equal weight percentage of particles having lower thermal conductivities.

The particles may be a metal. Examples of suitable metals are copper, nickel, steel, silver, gold, and titanium. The choice of metals is dictated at least by the cost of the materials. Other factors to be considered are the amount of thermal conductivity required and the type of environment in which the composition is to be used.

Carbon, graphite, or impervious graphite are relatively inexpensive forms of suitable carbonaceous material. Graphite has the advantage of being readily and cheaply available in a variety of shapes and sizes. Graphite is a refined form of carbon having a more structured state. Impervious graphite is a non-porous, solvent-resistant form of graphite. By using more refined grades, a more consistent thermal conductivity can be achieved.

Metals can be used to form the particles. The choice of metals includes the noble metals such as gold, silver, and platinum; as well as other metals such as copper, steel, iron, and titanium.

The invention encompasses a method for making compositions that include a resin and particles having a higher thermal conductivity than the resin. The first step is heating raw resin material until the resin has melted. The next step is mixing the unreacted melted resin and the particles. Next, the method includes injecting the unreacted resin containing the particles into a mold while simultaneously arranging the particles, or causing the particles to become arranged in preferred orientation and concentrations relative to the shape of the article being created. The resin is then set.

Thermoset compositions characteristically cross-link and become hard, or "set", when cured for a sufficient period of time. This change is permanent. Consequently, a molded part made of thermoset resin cannot be reworked. Often it is difficult to produce complex shapes with thermoset plastics because the cross-linking reaction hardens the material before molding can be completed. Cured thermoset plastics tend to exhibit good thermal and chemical resistance.

Thermoplastic compositions will flow when heated above their glass transition temperature, or melt transition temperature (if present), and solidify upon cooling, but these changes are reversible. They can be molded into complex shapes and worked into almost any form, e.g. film, fiber, and so forth. The form need not be permanent. If the thermoplastic article is heated above its glass or melt transition temperature, the plastic will become soft and begin to flow, destroying the shape of the material. Thermoplastic can be warmed and shaped. Restrapping allows the molded object to be adjusted during assembly. Also, the material can be recycled.

A multiport mold used during injection molding can create compositions having enhanced anisotropic thermal conductivity. A multiport mold has at least one opening and at least one exit. A multiport mold has the advantage of creating definite flow paths where the reactants are injected in the mold. A flow path is the course along which the unreacted material passes through the mold. In contrast, in a single port mold the flow path may be disrupted by means for allowing displaced gas to exit the mold as the mixture is injected.

When a composition containing LCP and particles is injected into a mold, the crystalline domains of the LCP are thought to align in the direction of the flow path and in the proximity of the sidewalls of the mold cavities. The particles are believed to align themselves in these flow paths thereby effectively connecting crystalline domains. The result is an enhanced thermal conductivity along the flow path. The enhanced conductivity of the composition is greater than the conductivity of the particles and LCP alone. If the amount of particles relative to resin decreases beyond a minimum threshold, the thermal conductivity quickly decreases. This minimum threshold is the relative amount of particles below which the domains are thought to become disconnected. When the relative amount is raised, the increase in thermal conductivity per amount of particles begins to diminish. In addition, a composition containing too many particles relative to resin becomes brittle and unworkable.

The invention also includes a method of extruding the composition. In the extrusion method, the resin raw material is liquified. Next, the particles are mixed into the resin raw material. Other ingredients such as flow inhibitors and impact modifiers may be added. The composition is then extruded through a suitably shaped orifice. The extruded composition is then cut to a suitable size. The composition is then set.

The invention further includes a method of lost-core molding the composition. In lost-core molding, a core having a lower melting point than the composition is positioned in the mold at the location where a cavity is desired in the resulting cast. The core can be melted after the cast has been set leaving a cavity or cavities in the cast. Lost-core molding allows the shaping of casts having complex cavities not normally achievable through injection molding. Typical cores are made from low melting-point materials such as bismuth alloys. Lost-core molding can be used to form complex shaped one-piece heat exchangers comprised a continuous piece of the composition. A single piece heat exchanger saves the expense of brazing and avoids leaky joints. When the composition is injected into a mold containing a core, the lost core method produces a compound having enhanced thermal conductivity along the flow paths of the mold.

As stated, a flow path is the course over which the resin-particle mixture enters and fills the mold. The increase in thermal conductivity is thought to be caused by the arrangement of particles which results by forming articles made of the composition by this method. As the materials are injected into a mold, the particles in the resin tend to align in paths corresponding to the flow of the material within the mold. In addition, the particles have been found to become more concentrated along the surface of the mold cavities during injection. Therefore, higher concentrations of particles collect at or near the perimeter walls of the resulting article, e.g. heat exchanger element.

Compositions made through the methods of injection molding, extrusion, and lost-core molding are included in the invention. These compositions have higher in-plane thermal conductivities along the flow paths and higher through-plane thermal conductivities at or near the perimeter walls of the article. This enhanced thermal conductivity is thought to be a result of the crystalline domains of the resin, and the particles aligning along the flow paths during formation of the articles.

The composition can be, among other things, injection molded or extruded in the basic shape of a plate or fin ("plate") Depending on the method of manufacture, the plate may have flow paths along which thermal conductivity is enhanced. In such plates, heat transfer in directions generally parallel to the orientation (i.e. preferred directions) of the particles is known as "in-plane" thermal conductivity and heat transfer. Heat transfer that is orthogonal to the preferred direction(s) of enhanced thermal conductivity is known as "through plane" thermal conductivity and heat transfer.

The compositions made through the method can be used to form a heat exchanger having improved performance over resin-only and unaligned resin-particle heat exchangers.

Preferably, the composition is constructed and arranged so that the flow paths are oriented to quickly transfer thermal energy from a heat source to a heat sink. Heat is quickly transferred into the composition and then along the flow paths which define paths of higher thermal conductivity through the article.

The preferred embodiment also includes less than one percent by weight of a flow inhibitor. The amount of flow inhibitor is the amount necessary to allow for the easy filling and setting of the composition in mold 30.

A preferred embodiment of the method to make the composition includes the following steps, which can best be understood by referring to FIGS. 5–18 of the drawings.

First, multiport mold 30 is used to form plate 41. Multiport mold 30 defines internal cavity 33, inlet 31, and outlet 32. Inlet 31 and outlet 32 provide access to internal cavity 33 by fluidly communicating cavity 33 with the exterior of mold 30. Preferably, inlet 31 and outlet 32 are arranged on opposing sides of mold 30. Mold 30 is formed from two halves 34 and 35. Screen 36 is placed between inlet 31 and cavity 33. Screen 36 is apertured and causes the unreacted reagents to spread across screen 36 before filling cavity 33. The unreacted reagents tend to follow definite flow paths as they flow through the holes in screen 36. Halves 34 and 35 are separated to release any contents from internal cavity 33 once the composition is set.

Plate 41 is formed by injecting the unreacted, mixed reagents into inlet 31. The reagents are injected in inlet 31, distribute across screen 36 and fill internal cavity 33. Any preexisting contents in cavity 33 including air are displaced through outlet 32 as cavity 33 is filled. The reagents are set by heating mold 30 for a predetermined period, depending upon the temperature and pressure conditions present and other factors known to those skilled in the art. Plate 41 is released from mold 30 by separating halves 34 and 35.

Figure 7:
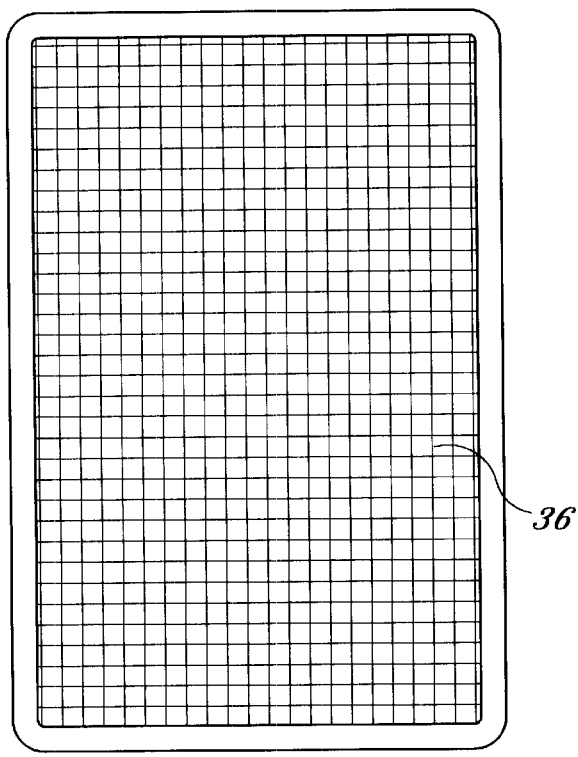
FIG. 7 is a cross-sectional view along line 7 of the mold shown in FIG. 6.
Figure 8:
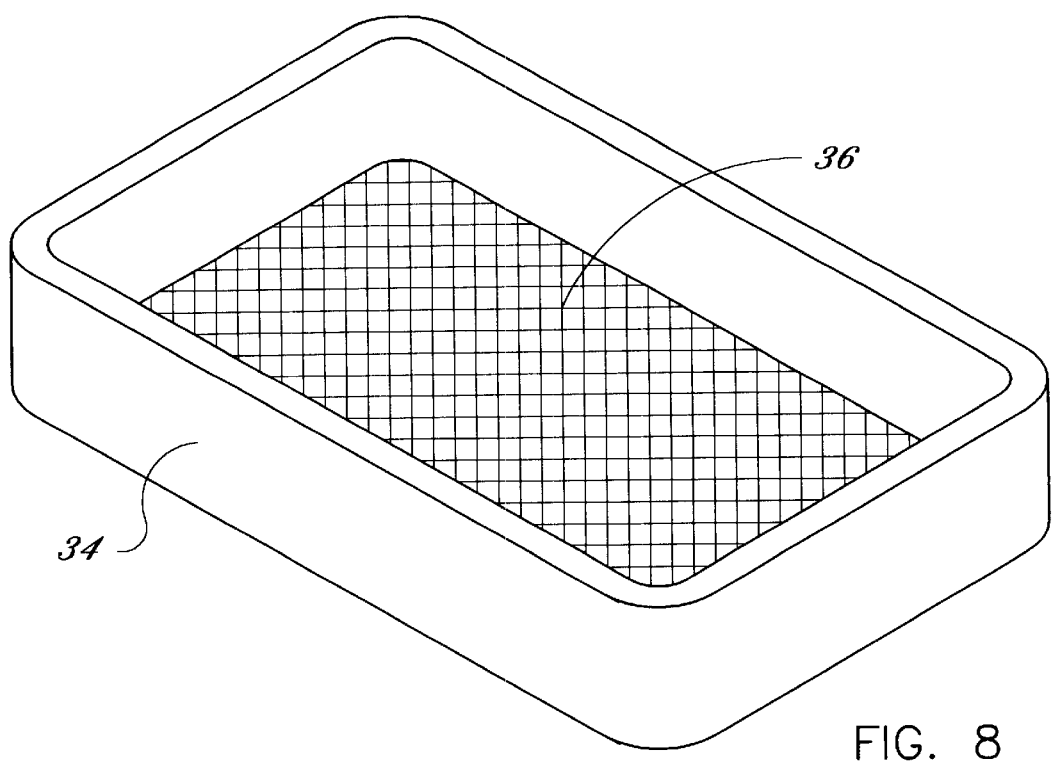
FIG. 8 is a perspective, cross-sectional view along line 7 of the mold shown in FIG. 6.
Figure 9:
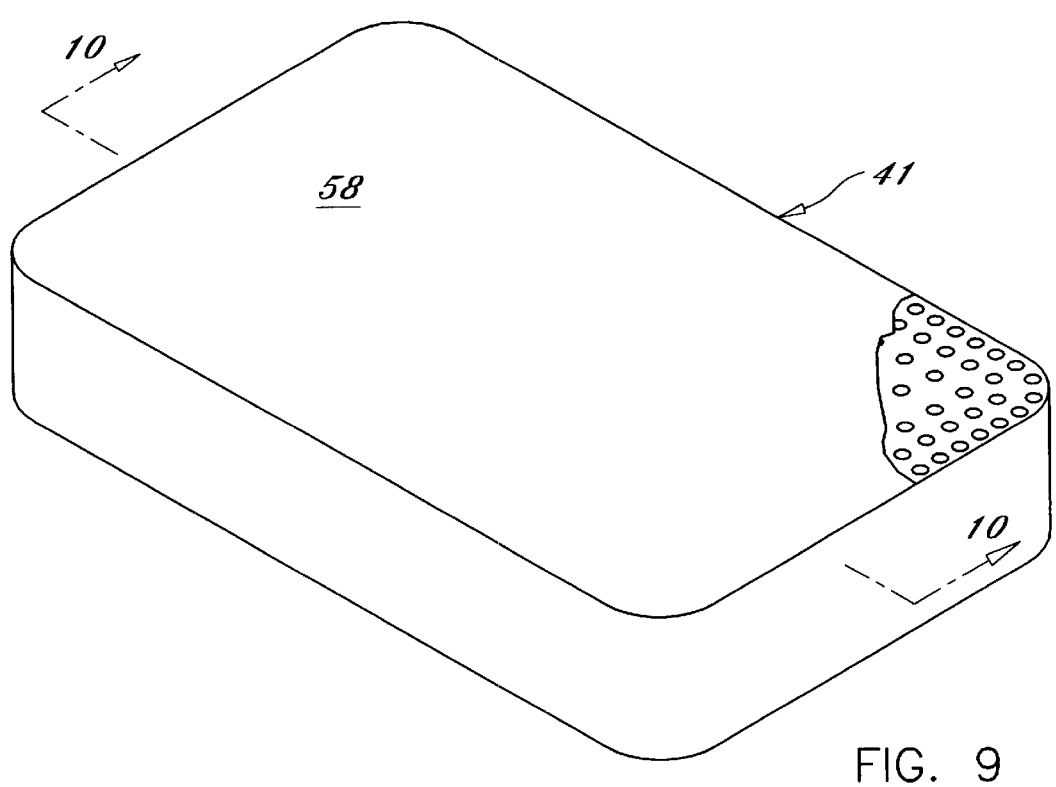
FIG. 9 is a perspective view of a plate made from the multiport mold with a corner exposed to show the arrangement of particles.
Figure 10:
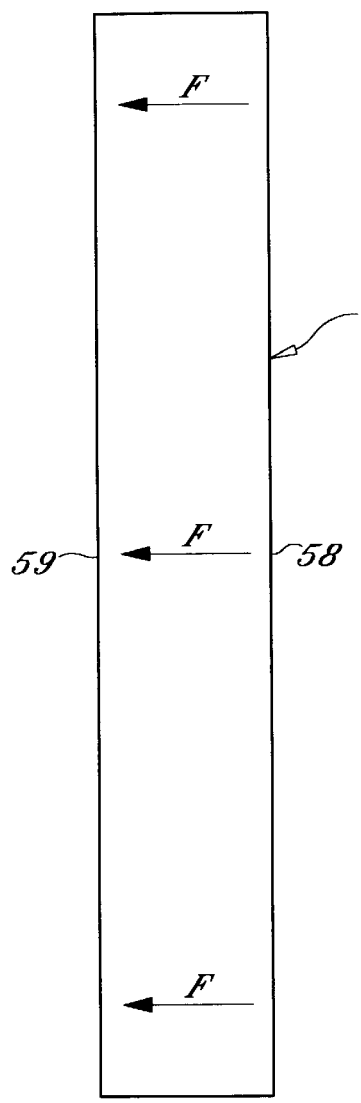
FIG. 10 is a side view of the plate.
Figure 11:
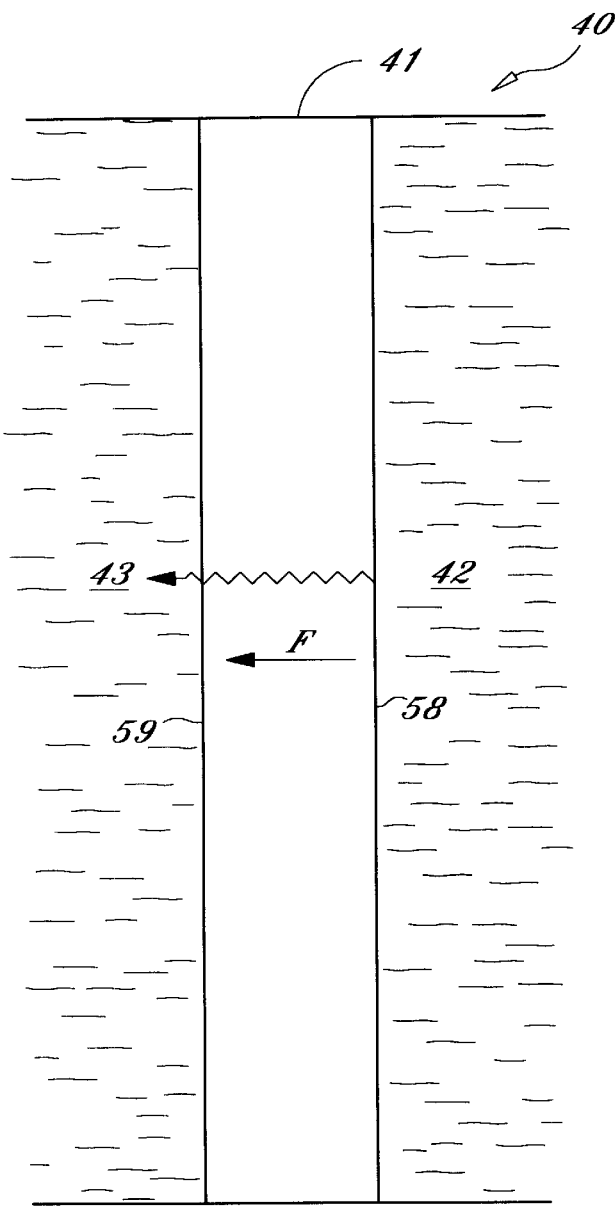
FIG. 11 is a side view of a heat exchanger made with the plate.
Figure 12:
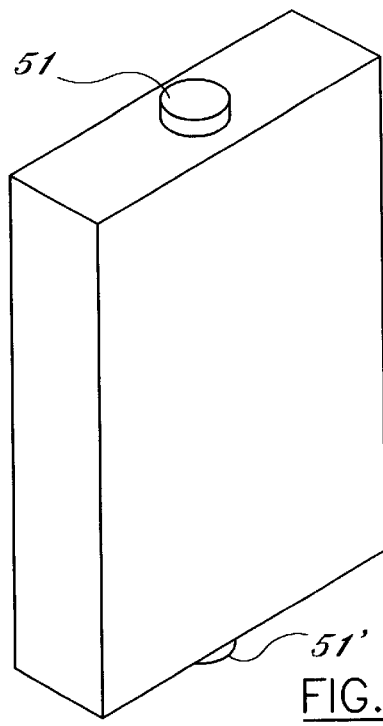
FIG. 12 is a perspective view of a core used to make an article in accordance with this invention using the lost core molding technique.
Figure 14:
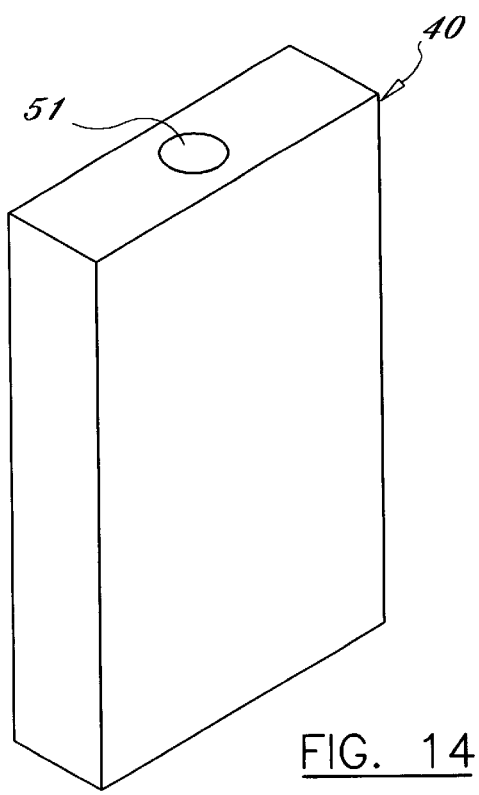
FIG. 14 is a perspective view of the cast made from the mold in FIG. 13 containing the core.
Figure 13:
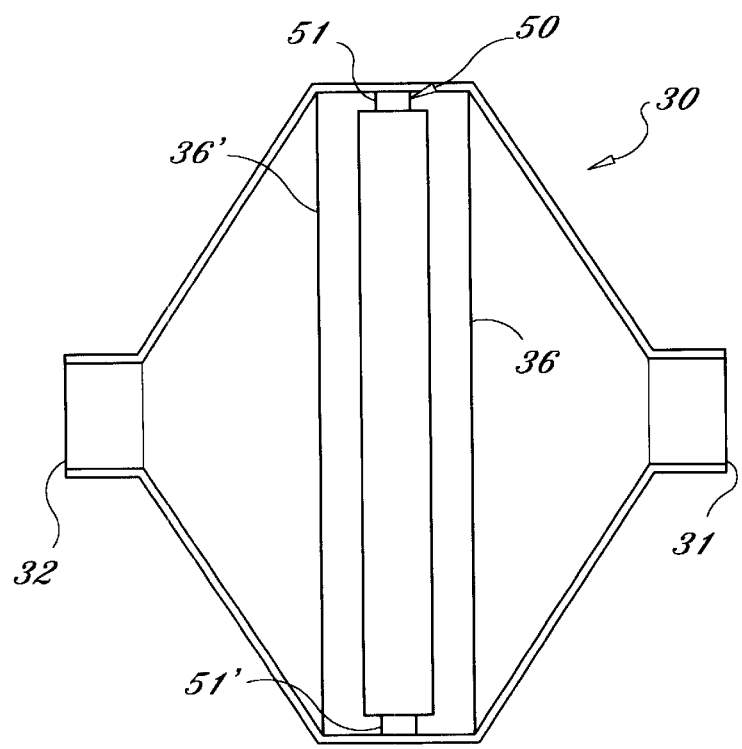
FIG. 13 is a side, cross-sectional view along line B—B of the multiport mold shown in FIG. 5 having the core of FIG. 12 inserted into the mold.
Figure 15:
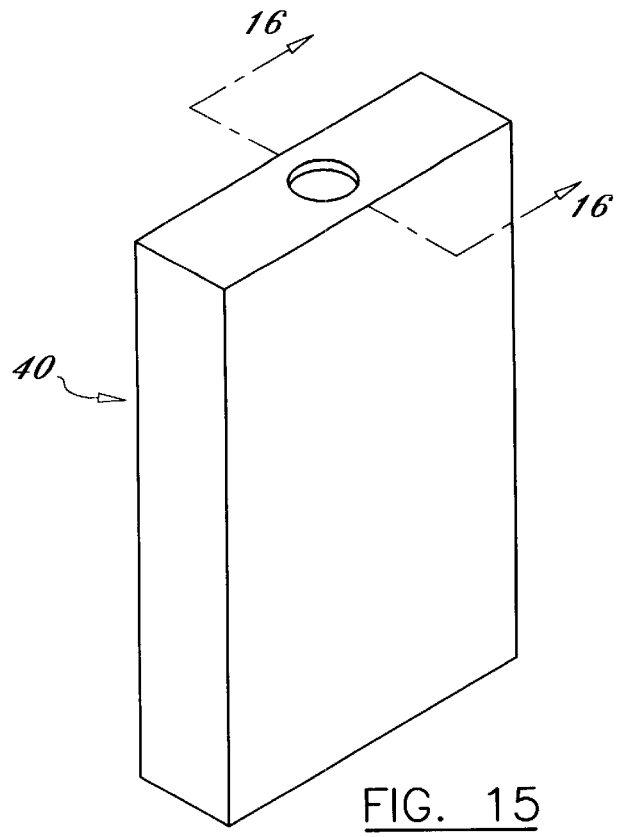
FIG. 15 is a perspective view of the cast in FIG. 9 having the core removed.
Figure 16:
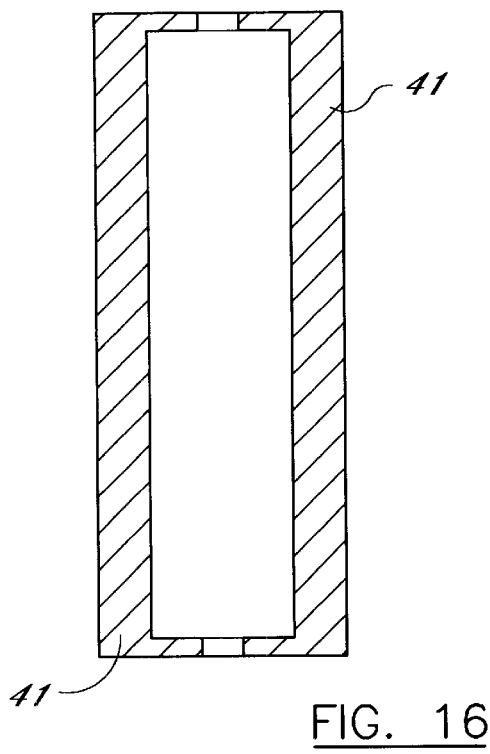
FIG. 16 is a side cross-sectional view along line 16 of the cast shown in FIG. 15.
Figure 18:
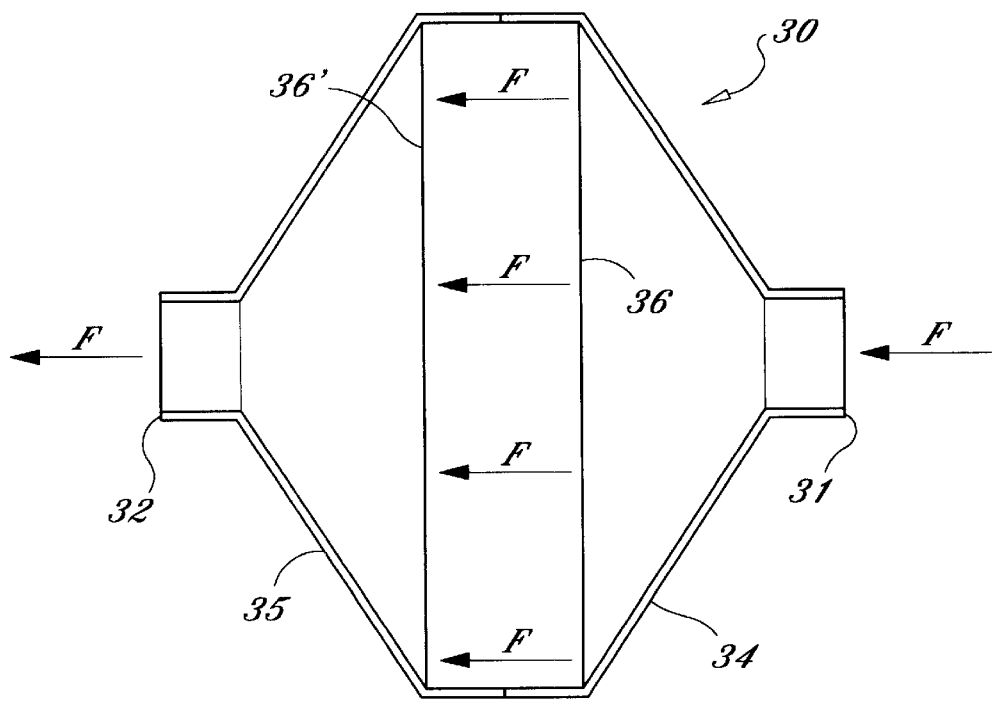
FIG. 18 is a side cross-sectional view cut along line 18 of the mold shown in FIG. 5 wherein the unreacted reagents are shown flowing into the mold.

FIGS. 7 and 8 show plate 41. Plate 41 contains particles 11. As a result of the method of formation, as shown in FIG. 18, particles 11 are arranged along flow path F, the path on which the reagents were injected into mold 30.

Figure 2:
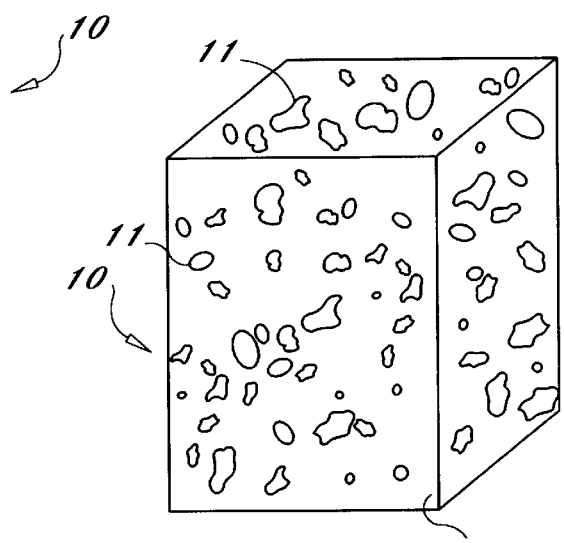
FIG. 2 shows an isotropic composition containing flakes.
Figure 3:
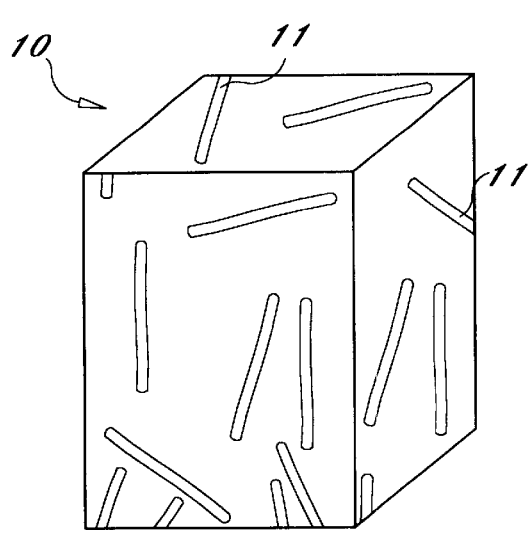
FIG. 3 shows an isotropic composition containing randomly-arranged fibers.

If the composition is made through a non-injection method, random distributions of particles 11 in resin 12 are expected. FIG. 1 shows cast 10 including powder particles 11 that are randomly distributed throughout resin 12. FIG. 2 shows cast 10 including flake-shaped particles 11 that are randomly distributed throughout resin 12. FIG. 3 shows cast 10 including fiber-shaped particles 11 that are randomly distributed throughout resin 12.

Figure 4:
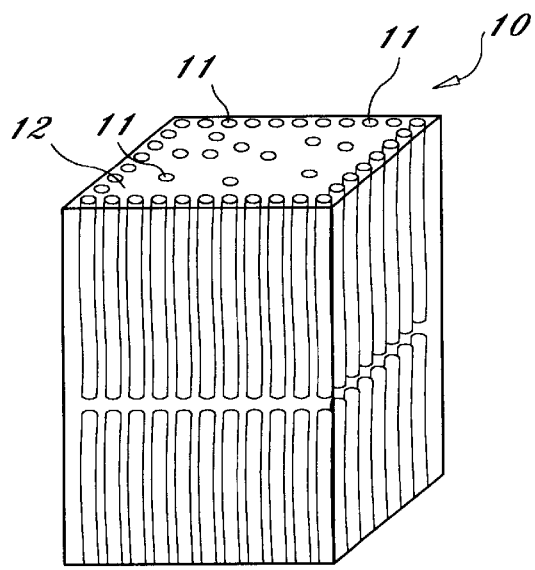
FIG. 4 shows an injection-mold anisotropic composition containing fibers.
Figures 5, 6:
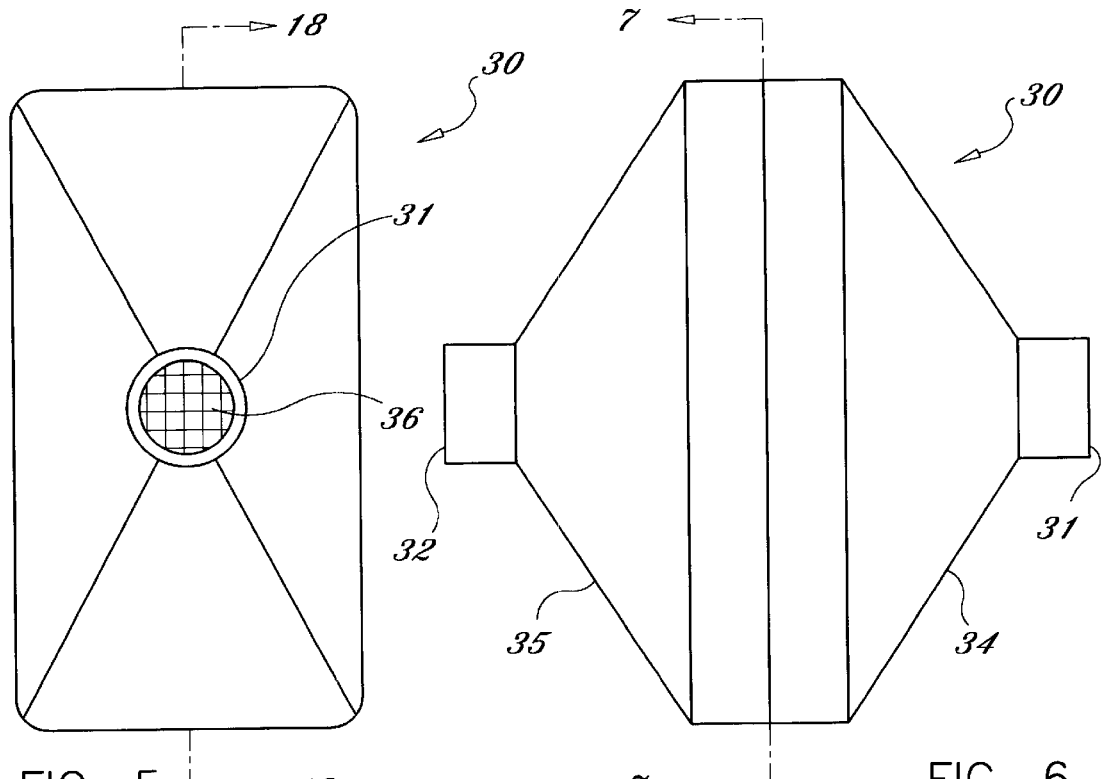
FIG. 5 is a front view of a multiport mold used to make an article in accordance with this invention.
FIG. 6 is a side view of the multiport mold used to make an article in accordance with the invention.

FIG. 4, shows a representative sample of an article manufactured by the method of this invention wherein carbonaceous fibers 11 are combined with resin and either injection molded or extruded so that fibers 11 are oriented: (1) adjacent and generally parallel to one another to enhance in-plane heat transfer, and (2) concentratedly near the surface 5 of the article to promote through-plane heat transfer in those regions. In this way, heat is transferred rapdily and efficiently into our out of the article and along and through the interior of the article.

Plate 41 is made of the composition through injection molding in multiport mold 30. Inlet 31 is located proximate front 58. Outlet 32 is located proximate back 59. Plate 41 contains flow path F that generally runs from front 58 to back 59. By having been made through injection molding, plate 41 has increased in-plane thermal conductivity along flow path F (see FIGS. 10 and 18).

The method of lost core injection molding can be used to form compositions having cavities (see FIGS. 12–16). Core 70 is inserted inside mold 30. Core 70 has a melting point higher than the temperature needed to set the resin. Core 70 does not dissolve when contacted by the unreacted liquid reagents. Core 70 can be fashioned from bismuth alloys, wax, salt or any suitable substance. The reagents are injected into mold 30 and set as described earlier. Cast 10 is released from mold 30. Cast 10 is heated until core 70 melts. As core 70 melts, cast 10 is left with spaces.

Figure 17:
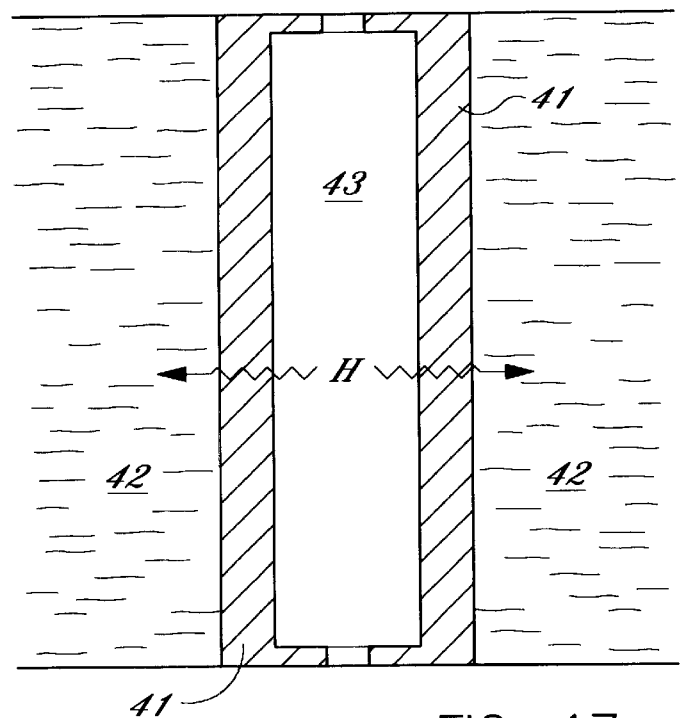
FIG. 17 shows a cross-sectional view of a heat exhanger made with the cast of FIG. 15 where the cross section is cut along line 16 of FIG. 16.

FIG. 17 shows heat exchanger 40 that can be made by using plate 41 to separate heat source 42 from heat sink 43. Plate 41 contains flow paths F along the direction of which heat is to be transferred: from heat source 42 to heat sink 43. Particles 11 orient along flow paths F during injection or extrusion. It is believed that the particles not only tend to congregate in higher proportions nearer the surfaces of the resultant articles but that the particles orient themselves with respect to each other in such a way that they form lines of thermal conduction along flow paths F. By utilizing injection molding and extrusion to manufacture apparatuses having particles aligned to maximize thermal conductivity in specific directions, articles having a much higher heat transfer efficiency than any hertobefore known are achieved. Applying this theory, Heat exchanger 40 is made from plate 41 which was lost core injection molded. Plate 41 separates heat source 42 and heating 43. Flow paths F run from heat source 42 to heat sink 43. Heat transfers quickly between heat source 42 is and heat sink 43 through plate 41. It is believed that heat is transferred by one or more of the known mechanisms of conduction, radiation and connection from source 42 to sink 43.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A thermally-conductive composition comprising:
    less than forty percent by weight of a resin having a resin thermal conductivity,
    a balance of said weight of particles having a particle thermal conductivity higher than said resin thermal conductivity; and
    wherein said resin is a liquid crystal polymer.

2. A method of making a thermally conductive article from a composition comprising no more than forty percent by weight of a resin having a resin thermal conductivity and particles having a particle thermal conductivity greater than said resin thermal conductivity, wherein said resin has a through-plane thermal conductivity and an in-plane conductivity and said in-plane conductivity is greater than said through-plane conductivity, comprising:
    injecting said composition into a mold along at least one flow path;
    orienting said particles in such a way that flow paths are created in said composition along which said particles and domains of said resin align creating anisotropic enhance thermal conductivity, and
    setting said composition.

3. A method as described in claim 2, wherein said mold has at least one inlet and at least one outlet.

4. A composition made through the method described in claim 2.

5. A composition as described in claim 3, wherein said particles are aligned along said flow path.

6. A heat exchanger comprising:
    a heat source,
    a heat sink,
    a plate made through the method described in claim 5 that separates said heat source and said heat sink, wherein said flow path connects said heat sink and said flow path.

* * * * *